United States Patent
Clarke

(10) Patent No.: US 7,588,437 B2
(45) Date of Patent: Sep. 15, 2009

(54) MOULD FOR INJECTION IMPACT COMPRESSION MOULDING

(75) Inventor: Peter Clarke, Petworth (GB)

(73) Assignee: IM-Pak Technologies Limited, Chichester (GB)

( * ) Notice: Subject to any disclaimer, the term of this patent is extended or adjusted under 35 U.S.C. 154(b) by 33 days.

(21) Appl. No.: 12/088,955

(22) PCT Filed: Oct. 1, 2006

(86) PCT No.: PCT/GB2006/050308

§ 371 (c)(1),
(2), (4) Date: Apr. 2, 2008

(87) PCT Pub. No.: WO2007/039767

PCT Pub. Date: Apr. 12, 2007

(65) Prior Publication Data

US 2009/0130244 A1    May 21, 2009

(30) Foreign Application Priority Data

Oct. 3, 2005    (GB) ................................ 0519936.9

(51) Int. Cl.
*B29C 45/56*    (2006.01)
(52) U.S. Cl. ...................... 425/190; 425/450.1; 425/589
(58) Field of Classification Search ................. 425/190, 425/450.1, 589, 595
See application file for complete search history.

(56) References Cited

U.S. PATENT DOCUMENTS

| 4,408,981 | A  | * | 10/1983 | Brown | ........................ | 425/589 |
| 7,090,800 | B2 | * | 8/2006  | Clarke | ........................ | 425/590 |
| 7,241,133 | B2 | * | 7/2007  | Wang | ........................ | 425/575 |

FOREIGN PATENT DOCUMENTS

| GB | 2410000    | * | 7/2005 |
| JP | 5192976    |   | 8/1993 |
| JP | 2003033954 |   | 2/2003 |

OTHER PUBLICATIONS

Mueller M: "Spritzpraege-Werkzeug Fuer Einen Teller," Kunststoffe, Munich, Germany, vol. 65, No. 8, Aug. 1975, p. 460.

* cited by examiner

*Primary Examiner*—James Mackey
(74) *Attorney, Agent, or Firm*—Smith-Hill & Bedell, P.C.

(57) ABSTRACT

A mould for injection compression moulding of an article includes two mould parts mounted on two relatively movable platens of an injection moulding machine and defining between them a cavity. A first mould part is supported on a first of the two platens in such a manner that it is capable of tilting out of parallel with the first platen. The first mould part is rigidly connected to at least one axially extending support bar which engages at its first end with a guide surface mounted in fixed relation to the first platen and which slidably engages at its second end with a guide surface mounted in fixed relation to the second platen, whereby in the closing stages of the mould, the weight of the first mould part is carried by the support bar while resting on both platens.

16 Claims, 5 Drawing Sheets

MOULD FOR INJECTION IMPACT COMPRESSION MOULDING

This is a national stage application filed under 35 Usc 371 based on International Application No. PCT/GB2006/050308 filed Oct. 1, 2006, and claims priority under 35 USC 119 of United Kingdom Patent Application No. 0519936.9 filed Oct. 3, 2005.

FIELD OF THE INVENTION

The present invention relates to a mould for injection of an article and is particularly applicable to a mould for injection impact compression moulding of a thin walled article.

BACKGROUND OF THE INVENTION

The concept of injection impact compression moulding is described in WO02/258909 and is applicable in particular to the moulding of articles, such as food containers and cups, that have a large flow length to thickness ratio. In this moulding technique, a measured dose of a plastics material is introduced into a mould cavity prior to the mould parts being brought together fully. At the time of its injection, the dose of plastics material does not fill the cavity which still retains some empty spaces. The rapid closing of the mould cavity is then relied upon to compress the plastics material and make it flow into the thin walled sections and to fill the mould cavity completely.

This technique differs from injection compression moulding, as used in the manufacture of lenses and compact disks where the mould cavity is filled at the end of the injection step and compression is used only to take up the shrinkage volume as the article cools down. In impact moulding, compression is used to fill the mould cavity and force the molten plastics material to flow into gaps into which it could not be made to penetrate by the action of the injection screw.

WO02/058909 describes a mould for mounting between the platens of an injection moulding machine for injection compression moulding of a thin walled article. The mould comprises a female mould part mounted on the stationary platen of a moulding machine and a pressure plate which is mounted on the moving platen and carries a core for closing the mould. The core passes through, and is sealed relative to, a cylindrical bore in a rim closure ring, which need not be circular, arranged between the female mould half and the pressure plate. In use, as the pressure plate is advanced towards the stationary mould half, the rim closure ring is used to seal the mould cavity before the core reaches its end position. Thus, when the plastics material is injected into the mould cavity, it is fully sealed even though the core has yet to be fully advanced into the mould to reduce its volume to its smallest size.

When using such a mould, or one operating on similar principles, for impact moulding, it is essential to maintain the core accurately centred on and in parallel alignment with the cavity in the female mould part not only when the mould is fully closed but throughout the movement of the core while the injected plastics material is being compressed. When the moulded article has a very thin wall thickness, a misalignment of as little as 0.1 mm can be totally unacceptable. This is not just because of the variation in the wall thickness of the finished article but because, during compression, the plastics material flows along the path of least resistance and variation in wall thickness results in the plastics material flowing at different rates up the sides of the cavity and reaching the rim at different times.

The conventional approach for aligning the parts of a mould in an injection moulding machine is to provide conical projections on one part to engage in conical recesses in the other as the mould closes. This ensures that the mould parts are correctly aligned before injection commences. However, this approach does not satisfy the requirements of the impact moulding technique because injection and compression commence before the mould is fully closed, that is to say before the conical projections have fully engaged with the conical recesses. Furthermore, the guiding of the machine platens relative to one another by the tie bars or other platen guiding system of the injection moulding machine does not guarantee alignment of the mould parts to the required degree of accuracy.

The above problem is addressed in GB 2,410,000 which teaches a mould comprising a female mould part and a core part mounted in use on the platens of an injection moulding machine for movement towards and away from one another between an open and a closed position. At least one of the parts is adjustable relative to the associated platen to permit the centres of the two parts to be aligned with one another. Three or more flat guide fingers are provided on one of the mould parts and distributed about the core axis to be received in recesses of complementary shape in the other mould part as the mould parts approach the fully closed position. Each finger has two parallel sided locating sections that are spaced from one another along the length of the finger. The locating section nearer the free end of the finger is narrower than the other and the length of each locating section is at least equal to the final part of the stroke of the platens during which compression of the injected plastics material takes place.

While the latter proposal enables the mould parts to be moved into concentric alignment with one another, it does not guarantee that the axes of the mould parts are parallel to one another at all times during the compression part of the stroke of the platens.

To elaborate on this point, it is important in the impact moulding technique to minimise the trapping of air in the mould because compression of the plastics material by rapid closure of the mould heats the trapped air and causes burn marks in the finished article. WO02/058909 therefore teaches what is now termed a "shuffle" movement of the core. In essence, this involves closing the cavity completely before injection of the dose of molten plastics material commences and retracting the core to make room in the cavity for the plastics material. Once an accurately metered full dose of plastics material has been injected, the core is advanced a second time to compress the molten plastics material and force it to fill the entire mould cavity. A simple manner of achieving this shuffle is to support the core part so that it can move axially relative to the platen on which it is supported and to urge it away from that platen using a force sufficiently weak to be overcome by the pressure exerted by the injection screw.

In WO02/058909, it is assumed that the core part is supported on the platen in such a manner that it remains perfectly parallel to the face of the platen as it moves towards and away from it. However, the support bearings and the tie rods of the injection moulding machine are not able to guarantee correct alignment of the core plate to the degree of accuracy that it is required during impact moulding especially in view of the considerable weight of the core part of the mould and the closure plate that it carries.

OBJECT OF THE INVENTION

The invention therefore seeks to provide a mould in which precise alignment of the parts in all planes is assured as the mould parts are being moved towards one another and not just when the mould is fully closed.

SUMMARY OF THE INVENTION

According to the present invention, there is provided a mould for injection compression moulding of an article, comprising two mould parts mounted on two relatively movable platens of an injection moulding machine and defining between them a cavity, characterised in that a first mould part is supported on a first of the two platens in such a manner that it is capable of tilting out of parallel with the first platen and wherein the first mould part is rigidly connected to at least one axially extending support bar which engages at its first end with a guide surface mounted in fixed relation to the first platen and which slidably engages at its second end with a guide surface mounted in fixed relation to the second platen, whereby in the closing stages of the mould, the weight of the first mould part is carried by the support bar while resting on both platens.

Preferably, the support bar is provided at least at its second end with two mutually inclined support surfaces which interact with two mutually inclined guide surfaces fixed in relation to the second platen.

It is further preferred for the support bar also to be provided with two mutually inclined surfaces at its first end to engage with mutually inclined guide surfaces fixed in relation to the first platen.

Though it is possible to employ a single support bar, it is preferred to provide two such bars spaced across the width of the first mould part and extending in parallel with one another.

In the case of a mould for impact moulding, the mould may additionally comprise a closure plate for closing the cavity before the two mould parts have reached their distance of minimum separation to minimise the volume of the cavity. Such a closure plate may suitably be carried on the first mould part and be movable relative to it. Furthermore, the first mould part may be mounted so that it can move axially relative to the first platen.

Conveniently, prior to the weight of the first mould part being taken up by the support bar(s), it is supported by resting on a platform or arm that projects from the first platen towards the second platen.

Where the first mould part can move axially relative to the platen, the first mould part may conveniently be provided at its lower end with rollers or a trolley to ride on the platform.

The support surfaces on the support bars or the guide surfaces on the platens may advantageously have a tapered run-in section to correct the attitude of the first mould part gradually as its weight is taken up at the opposite ends of the support bars. When using mutually inclined surfaces, such tapering of both surfaces will result in the support or guide surfaces taking on the appearance of the bow of a boat.

It is preferred for the support surfaces of the support bar to be continuous flat surfaces and for the guide surfaces to be formed by rollers. Supporting the weight of the first mould part on rollers rather than slides provides the benefit of lower wear and allows fine adjustment in that the rollers can be mounted on eccentrics to allow them some degree of movement.

Though the support bars will ensure some degree of centering of the mould parts relative to one another, it is preferred to improve the accuracy of the alignment using guide fingers as proposed in GB 2,410,000.

It is thus preferred to provide a plurality of guide fingers on one of the mould parts and distributed about the central axis to be received in recesses of complementary shape in the other mould part as the mould parts approach the fully closed position, each finger having two parallel sided locating sections that are spaced from one another along the length of the finger and the locating section nearer the free end of the finger being narrower than the other. In the case of a mould for impact moulding, the length of each locating section should be at least equal to the final part of the stroke of the platens during which compression of the injected plastics material takes place.

GB 2,410,000 teaches recesses having a complementary shape to the fingers. This requires precise matching of the fingers and the mating recesses and both parts are prone to wear. It is therefore preferred to provide in place of the recesses pairs of rollers to engage the opposite parallel sides of the locating sections of the fingers. If these rollers are mounted on eccentrics, their position can be fine tuned not only to reduce the clearance to zero but event to apply a slight preload so that each locating section is gripped between two pairs of rollers as the mould parts approach the closed position.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
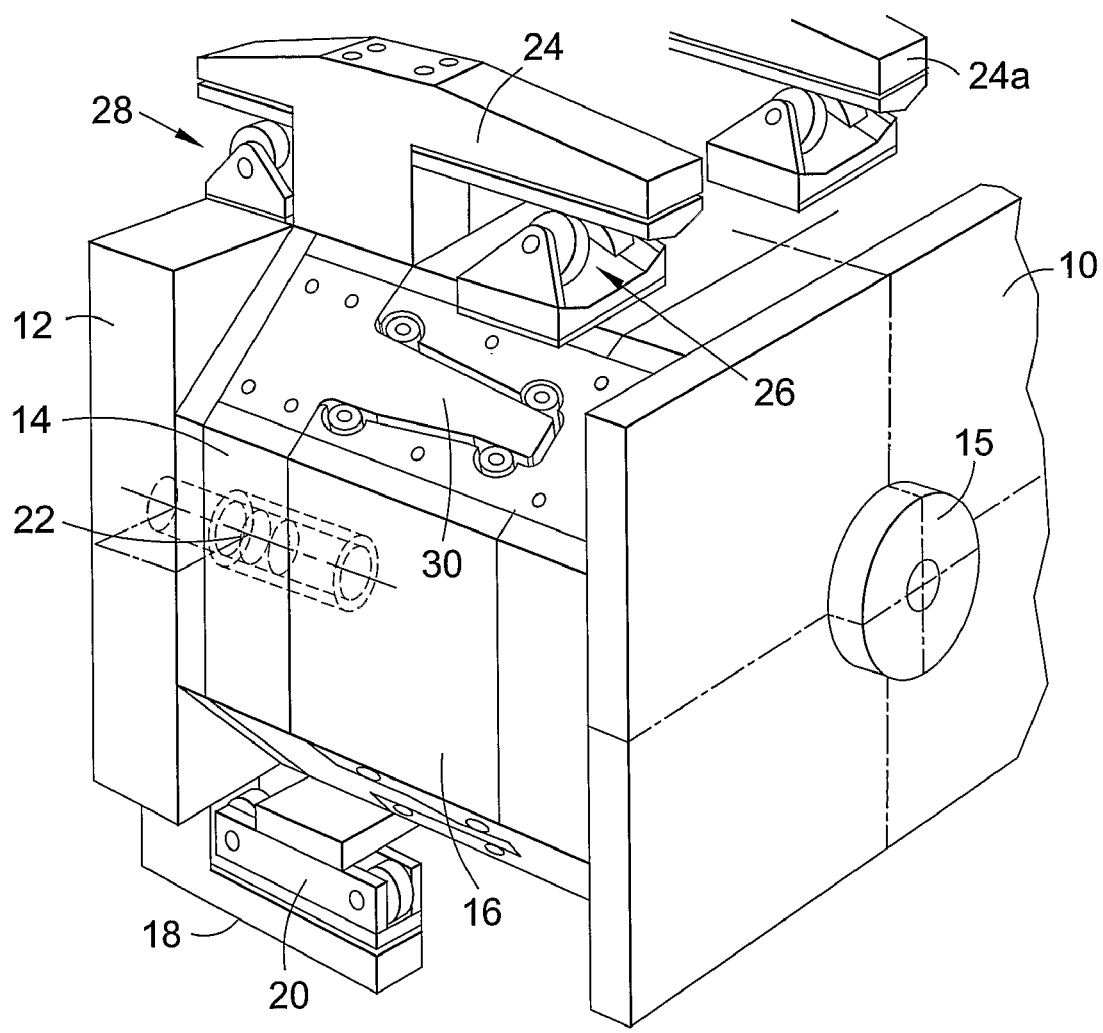
FIG. 1 is a perspective view of a mould of the invention with the mould parts in the closed position.

The drawings show a stationary platen 10 and a movable platen 12 of an injection moulding machine. The mechanism used to guide and move the platen 12 relative to the platen 10 is not shown as it is generally conventional. The invention resides in the mould itself rather than in the injection moulding machine on which the mould is mounted.

The mould is formed of a first part 14, which is movable and is also referred to herein as the core part for reasons which will become apparent. A second part 16 of the mould is mounted on the stationary platen 10 and will be also be referred to as the cavity part. The core part 14 has a core 14a (see FIG. 2) which fits within a depression in the cavity part, to define a cavity having the shape of a disposable drinking cup. Plastics material is injected into the cavity through a gate 15 in the platen 10. The plastics material flows from the gate to a dosing cylinder (not shown) and subsequently into the cavity.

The illustrated mould is intended for injection impact compression moulding of drinking cups and operates on the principle described in WO02/258909. The core part 14 carries a closure plate which is not shown but is as described in PCT/GB2004/005422. Before the two parts of the mould are brought to the closed position shown in FIG. 1, the closure plate seals off the cavity defined between the core 14a and the depression in the cavity part. The mould is first closed to displace as much as a possible out of the mould cavity. While the core part is urged away from the platen 12 by an air cylinder that applies a relatively low force to close the mould, a dose of plastics material is injected into the cavity. The injection pressure is sufficient to cause the core part 14 to move back towards the platen 12 against the action of the air cylinder. In this way, a billet of plastics material is injected that covers the entire base of the cup but does not flow up the side walls. Next, the platen 12 is advanced to the point that it makes direct contact with the core part 12 to apply a much greater force to compress the billet rapidly and cause the molten plastics material to flow into the narrow gap defining the side walls of the cup until it reaches the rim.

For the above process to operate correctly, it is vital to ensure correct alignment of the mould parts 14 and 16 not only when the mould is in the fully closed position shown in FIG. 1 but also throughout the impact moulding phase when the billet is compressed to force the plastics material to flow into the gap defining the side walls of the cup. It is not only important for the centres of the mould parts to be in line with one another but the axis of the core 12a should also remain parallel to the axis of the depression in the cavity part.

It will be noted that the core part of the mould is required to move in relation to the moving platen 12 and conventionally it has been assumed that the core part is so well supported and guided on the platen 12 that it may be assumed that it can never move out of parallel alignment with the platen 12. Though this may well have proved the case in conventional injection and injection compression moulding, it does not meet the requirements of impact moulding. There is a tendency for the front end of the core part, because of its weight, to tilt forwards relative to the plane of the platen 12 and not even the best bearings currently available can ensure the accuracy of alignment needed for impact moulding.

The present invention is therefore predicated on the realisation that during the closing phase of the mould, it is not sufficient for the core part to be supported in cantilever fashion on only one machine platen but its weight must the born by both platens.

In the described embodiment (see FIGS. 1 and 2), the core part 14 of the mould is mounted for movement relative to the moving platen 21 by virtue of being carried on a platform 18 made up of two arms that project forward (i.e. towards the stationary plate 10) from the moving platen 12. A trolley 20 having wheels or rollers 50 and bolted to the underside of the core part 14 rides on the platform to allow the core part to move axially relative to the platen 12.

Figure 7:
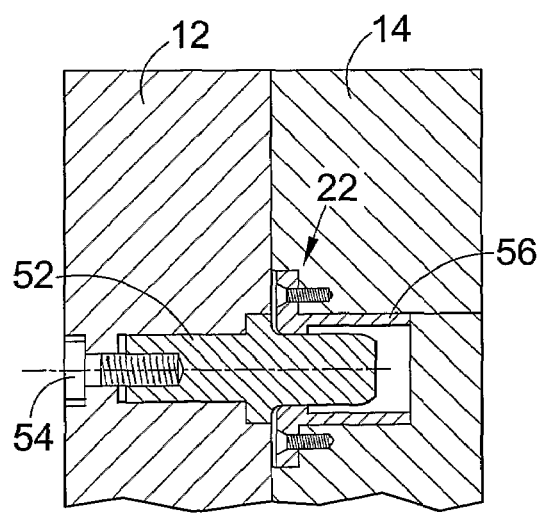
FIG. 7 shows a section through a bush mounting the movable mould part on the movable platen when the mould is in a closed position.
Figure 8:
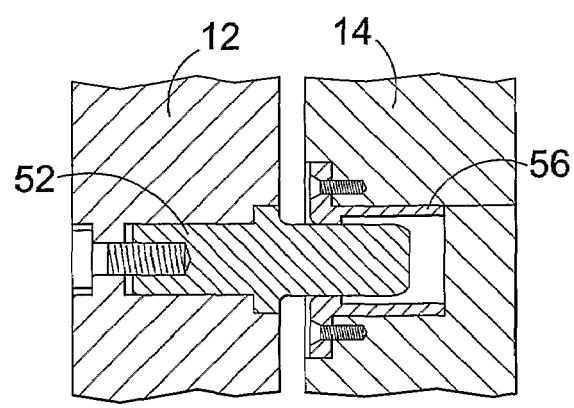
FIG. 8 shows the bush of FIG. 8 when the mould is in the process of being closed.

Vertical alignment of the core part 12 relative to the moving platen 12 is assured by a pair of bushes 22 which are herein referred to as wobble bushes because they are intentionally designed to allow the plane of the rear face of the core part 14 to move out of parallel alignment with the platen 12. As shown in FIGS. 7 and 8, each wobble bush comprises a spigot 52 that projects from the platen 12, in which it is held in place by means of a bolt 54. The projecting end of the spigot 52 is received in a sleeve or bush lining a bore 58 in the core part 14. The bush has an inwardly projecting annulus that is rounded to form a narrow region of contact with the spigot 52 so as to allow the core part 14 to tilt about a horizontal axis. The mounting of the core part 14 on the platen is thus intentionally designed to allow some tilting movement and the centreline of the core 14a may therefore not be parallel to the centreline of the cavity depression as the mould parts are brought together.

Figure 2:
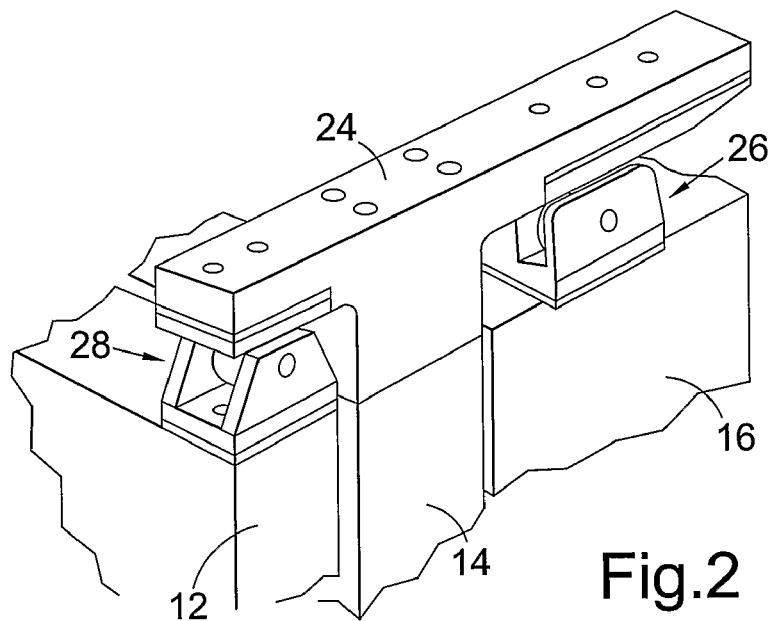
FIG. 2 is a detail of the mould in FIG. 1 showing one of the two support bars carrying the movable mould part.

Correct alignment is instead assured by means of two support bars 24 and 24a, herein referred to as T-bars on account of their shape which is best shown in FIGS. 1 and 2. The core part 14 it bolted to these T-bars 24 which are oriented to project axially from the core part 14 in both direction. The projecting ends of the T-bars 24 rest on guides 28 and 26 which are each fixed to a respective one of the platens 10 and 12. In the closing stages of the mould, the core part 14 is therefore suspended from support bars 24 that are correctly aligned with both machine platens and it is this that ensure that the axis of the core 14a does not droop and is held in accurate alignment with the depression in the cavity part 16.

Figure 3:
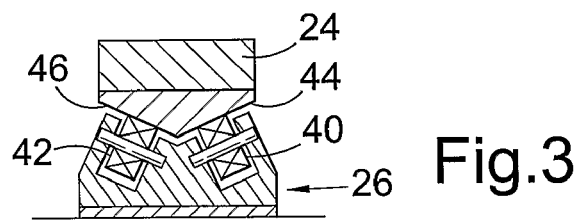
FIG. 3 is a section through the front end of the support bar of FIG. 3 while resting on a guide surfaces secured to the stationary mould part.
Figure 4:
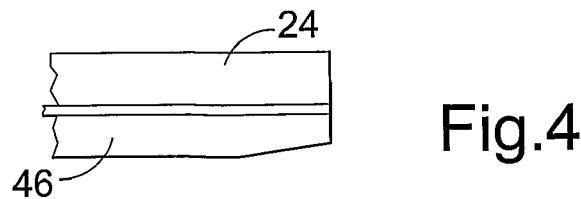
FIG. 4 is a side view of the front end of the support bar in FIGS. 2 and 3.
Figure 5:
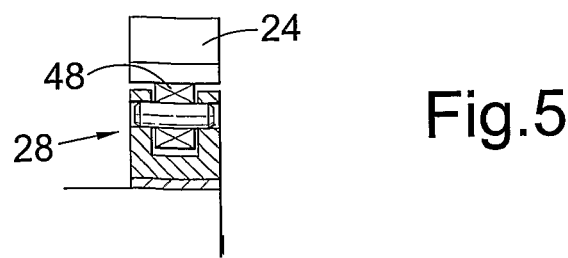
FIG. 5 is a section through the rear end of the support bar of FIG. 3 while resting on a guide surface secured to the moving platen.
Figure 6:
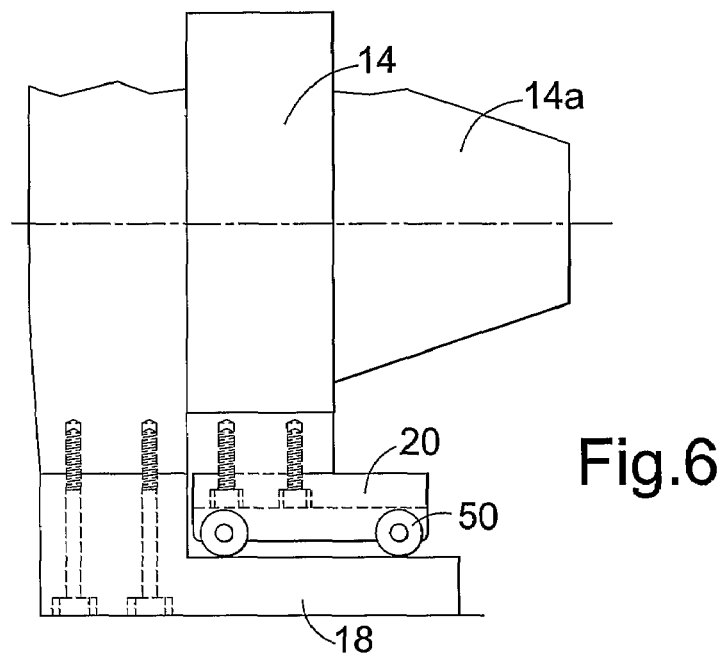
FIG. 6 is a partial side view of the movable mould part and the movable platen by which it is carried.

To ensure correct alignment of the axis in the vertical plane, it suffices for the T-bars to have a flat lower surface, as is the case of the rearwardly projecting end of the T-bars 24 which rests (see FIG. 5) on a horizontal guide surface formed by the outer race of a bearing 48. However by providing mutually inclined lower surfaces 44 and 46, resting on two mutually inclined guide surfaces, as shown in FIGS. 3 and 4 for the front end of the T-bars 24, it is possible additionally to ensure alignment of the axis of the core in a horizontal plane. Once again, each guide surfaces at the front end of the T-bars 24 is shown as being formed by the outer race of a bearing 40, 42. If desired, the rear ends of the T-bars 2 may be formed in the same manner as shown for the front ends, i.e. V-shaped.

When the front ends of the T-bars 24 reach the guides 26 on the stationary platen 10 (or the cavity part 16) they may not be correctly aligned. For this reason, the front ends of the T-bars have a tapering leading edge, as shown in FIG. 4, so that the shape of the bottom of each T-bar resembled the bow of a boat.

The bearings in the guides 26 and 28 may be mounted adjustably, for example on eccentric pins or pins with surrounding eccentric sleeves, to allow fine adjustment during initial set up and readjustment to compensate for wear.

Figure 12:
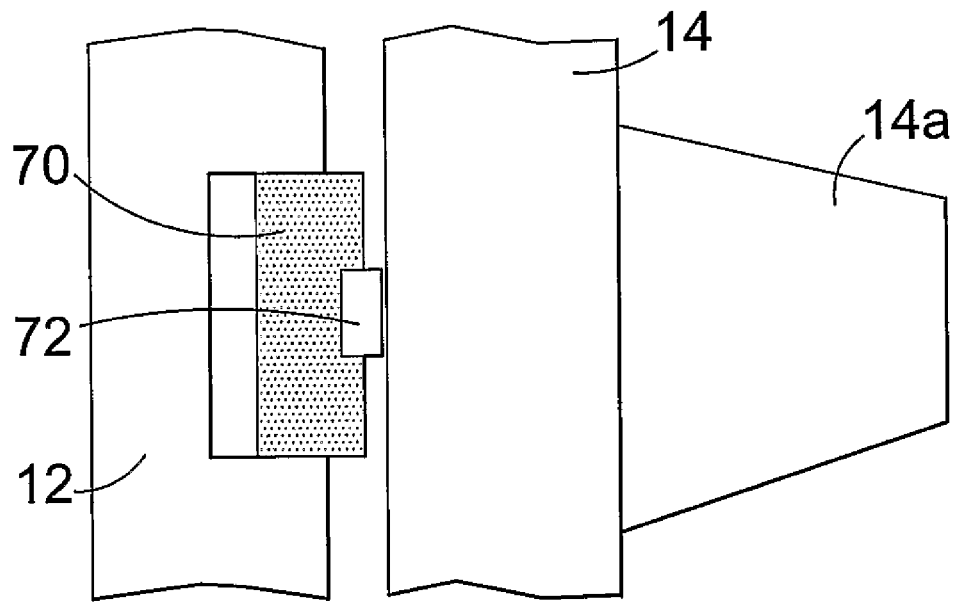
FIGS. 12 and 13 show details of the operation of the air cylinder that acts to urge the core plate away from the movable machine platen.
Figure 13:
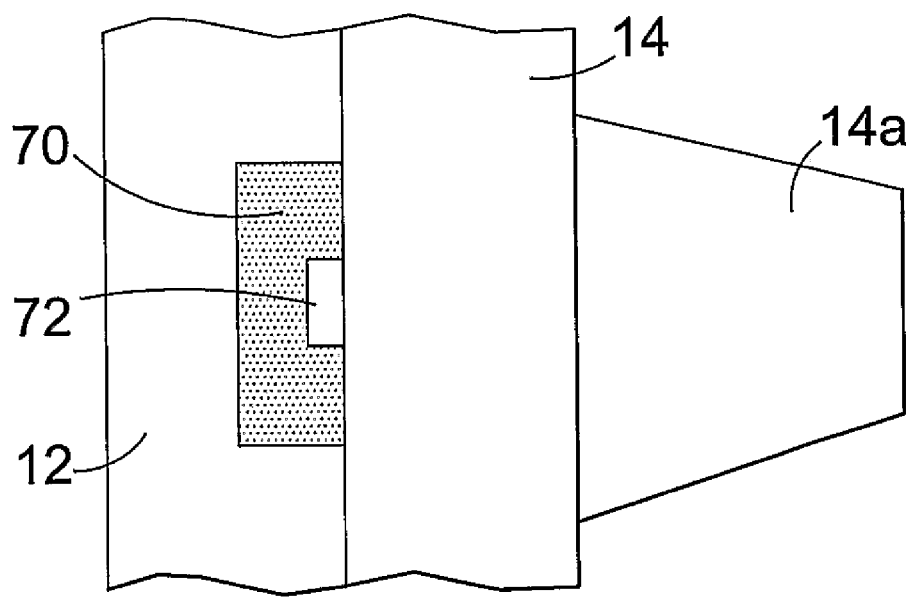

It is desirable to ensure that the core part can pivot about a point lying on the axis of the core 14a as it is being pushed towards the closed position by the movable machine platen 12. This is conveniently achieved by the construction shown in FIGS. 12 and 13. The core part 14 is urged towards the cavity part by means of the piston 70 of a pneumatic jack mounted within the platen 12. A compressible button 72, made for example from an elastomeric material, is mounted at the centre of the front face of the piston 70. While applying an axial force to push the core part 14, the button 72 allows the attitude of the core part to be readjusted as necessary for alignment with the cavity part 16. When the mould is fully closed during the compression phase, the button 72 is fully compressed, and the piston 70 is fully retracted into its cylinder so that the platen 12 makes direct contact with the core part 14.

Despite the improved alignment afforded by the T-bars 24 and 24a, it is desirable to resort to guide fingers, operating on the principle taught in GB 2,410,000. In the illustrated embodiment, four guide fingers 30 are provided, one at each corner of the mould. Each finger has a narrow parallel sides guide section at one end and a wider parallel sides section at the other with a tapering section in between. In GB 2,410,000 these guide sections are received in recesses of complementary shape but in the illustrated preferred embodiment of the invention rollers are used in place stationary guide surfaces.

Figure 11A:
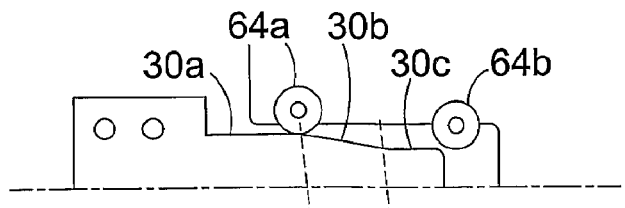
Figure 11B:
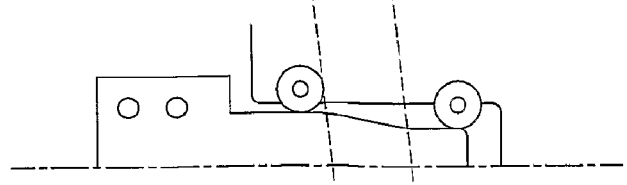
Figure 11C:
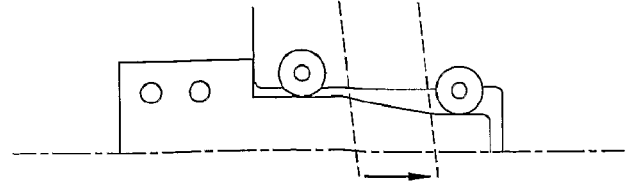

The operation of the guide fingers is readily seen from FIG. 11a to 11a. The fingers 30 have a narrow region 30c at their tip, a wider region 30a at their base and a tapering region 30b extending between the other two regions 30a and 30c. The two pairs of rollers are labelled 64a and 64b in FIGS. 11a to 11c to distinguish them from one another. It can be seen from FIG. 11a that the separation of the two pairs of rollers 64a and 64b is such that the wider regions 30a of the fingers reach the rollers 64a before the narrower regions 30c reach the rollers 64b. As a result, in the event of any slight misalignment, the first contact that will occur will be between the tapering regions 30b and one of the rollers of the first pair of rollers 64a. This contact will gradually effect the necessary realignment so that by when the wider region 30a enters between the rollers 64a, the narrower region 30c will be in correct alignment with the rollers 64b.

It is important to note that each finger only provides alignment in one plane. In the case of the finger shown in FIG. 11a to 11c, this is the plane of the drawing and nothing prevents the finger from moving in or out of the plane of the drawing. This is necessary because of the possibility of differential expansion between the two parts of the mould. If the flat fingers were to be replaced by conically tapering cylinders, the mould parts could be locked together permanently.

Figure 9:
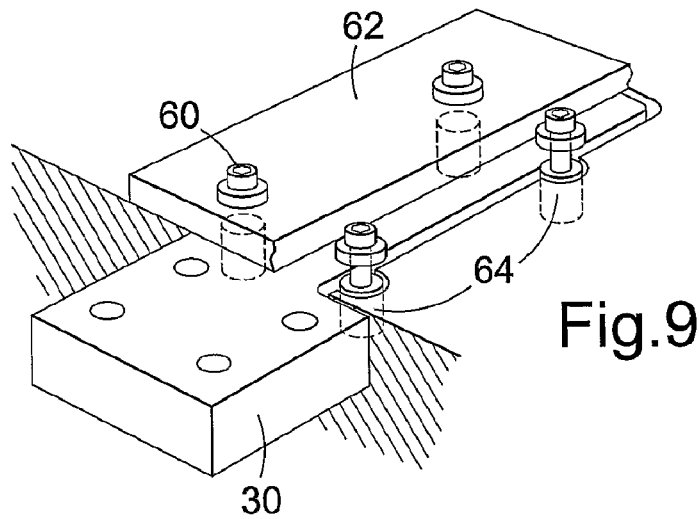
FIG. 9 is a partially cut away view showing one of the fingers and guide recesses of FIG. 1 that serve to alight the two mould parts accurately as the mould is being closed.
Figure 10:
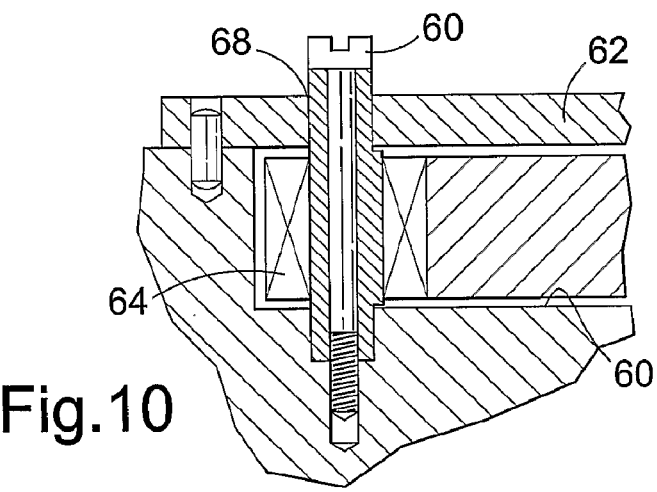
FIG. 10 is a section through one of the rollers in FIG. 9, FIGS. 11A, 11B and 11C show how the fingers and guide recesses of FIG. 9 interact with one another at three different stages during the closing of the mould.

As shown in FIGS. 9 and 10, the fingers 30 enter into a recess 60 that is covered by means of a cover plate 62. The rollers that grip the guide sections of the fingers 30 are formed by bearings 64 mounted on the cavity part 16 by means of bolts 66 surrounded by eccentric sleeves that allow adjustment of the positions of the bearings 64. This not only allows any slack to be eliminated but preferably enables a slight preload to be applied between each opposed pair of rollers to assure that these is no play whatever between the mould parts as they approach the closed position during the compression phase of the operating cycle.

As an alternative to the above construction of the fingers, it is possible to use tapered fingers cooperating with stationary inserts as described in GB 2,410,000.

For simplicity, the invention has been described by reference to a mould having a single cavity and a single mould face. It should be mentioned for completeness, however, that the invention is equally applicable to moulds with multiple cavities and to stack moulds having more than one mould face.

It will be appreciated that various modifications can be made to the mould as described above without departing from the scope of the invention as set forth in the appended claims. For example, though the plastics material has been described as being injected through the bottom of the cavity, it would be alternatively possible to inject the plastics material from the core side of the mould.

The invention claimed is:

1. A mould for injection compression moulding of an article, comprising two mould parts mounted on two relatively movable platens of an injection moulding machine and defining between them a cavity, wherein a first mould part is supported on a first of the two platens in such a manner that it is capable of tilting out of parallel with the first platen and wherein the first mould part is rigidly connected to at least one axially extending support bar which engages at its first end with a guide surface mounted in fixed relation to the first platen and which slidably engages at its second end with a guide surface mounted in fixed relation to the second platen, whereby in the closing stages of the mould, the weight of the first mould part is carried by the support bar while resting on both platens.

2. A mould as claimed in claim 1, wherein the support bar is provided at least at its second end with two mutually inclined support surfaces which interact with two mutually inclined guide surfaces fixed in relation to the second platen.

3. A mould as claimed in claim 2, wherein the support bar is provided with two mutually inclined surfaces at its first end to engage with mutually inclined guide surfaces fixed in relation to the first platen.

4. A mould as claimed in claim 1, wherein two support bars are provided spaced across the width of the first mould part and extending in parallel with one another.

5. A mould as claimed in claim 1, wherein the mould comprises a closure plate for closing the cavity before the two mould parts have reached their distance of minimum separation to minimise the volume of the cavity.

6. A mould as claimed in claim 5, wherein the closure plate is carried on the first mould part and is movable relative thereto.

7. A mould as claimed in claim 1, wherein the first mould part is mounted for axial movement relative to the first platen.

8. A mould as claimed in claim 7, wherein, prior to the weight of the first mould part being taken up by the at least one support bar, the first mould part is supported by resting on a platform or an arm that projects from the first platen towards the second platen.

9. A mould as claimed in claim 8, wherein the first mould part is provided at its lower end with rollers or a trolley to ride on the platform.

10. A mould as claimed claim 1, wherein the support surfaces on the support bars or the guide surfaces on the platens have an inclined run-in section to correct the attitude of the first mould part gradually as its weight is taken up at the opposite ends of the support bars.

11. A mould as claimed in claim 1, wherein the support surfaces of the support bar are continuous flat surfaces and each guide surface is formed by a roller.

12. A mould as claimed in claim 1, wherein a plurality of guide fingers is provided on one of the mould parts and distributed about the central axis to be received in guide recesses in the other mould part as the mould parts approach the fully closed position, each guide finger constraining relative movement of the mould parts in only one plane.

13. A mould as claimed in claim 12, wherein each finger has two parallel sided locating sections that are spaced from one another along the length of the finger and the locating section nearer the free end of the finger being narrower than the other.

14. A mould as claimed in claim 13, wherein the guide recesses comprise pairs of rollers to engage the opposite parallel sides of the locating sections of the fingers.

15. A mould as claimed in claim 14, wherein the rollers are adjustably mounted.

16. A mould as claimed in claim 14, wherein each roller is mounted on eccentric pins or sleeve.

* * * * *